(12) United States Patent
Neale (10) Patent No.: US 7,695,050 B2
(45) Date of Patent: Apr. 13, 2010

(54) VEHICLE HAVING AERODYNAMIC FAN ELEMENTS

(76) Inventor: Colin Neale, 39473 Village Run Dr., Northville, MI (US) 48168

(*) Notice: Subject to any disclaimer, the term of this patent is extended or adjusted under 35 U.S.C. 154(b) by 0 days.

(21) Appl. No.: 12/491,751

(22) Filed: Jun. 25, 2009

(65) Prior Publication Data

US 2009/0302639 A1    Dec. 10, 2009

Related U.S. Application Data

(63) Continuation-in-part of application No. 11/933,840, filed on Nov. 1, 2007.

(60) Provisional application No. 60/863,878, filed on Nov. 1, 2006.

(51) Int. Cl.
*B62D 35/00* (2006.01)
(52) U.S. Cl. ..................... 296/180.1; 180/903
(58) Field of Classification Search .............. 296/180.1; 180/903
See application file for complete search history.

(56) References Cited

U.S. PATENT DOCUMENTS

| | | | |
|---|---|---|---|
| 2,021,784 A | 11/1935 | Hochstadt | |
| 2,242,494 A * | 5/1941 | Wolf | 180/68.1 |
| 3,591,229 A | 7/1971 | Wilfert et al. | |
| 4,838,603 A * | 6/1989 | Masoero et al. | 296/180.1 |
| 5,407,245 A * | 4/1995 | Geropp | 296/180.1 |
| 5,842,734 A * | 12/1998 | Lechner | 296/180.1 |
| 5,884,666 A | 3/1999 | Johnson | |
| 5,927,795 A * | 7/1999 | Townend | 296/180.1 |
| 7,152,908 B2 | 12/2006 | Shahbazi | |
| 7,175,229 B2 | 2/2007 | Garcia | |
| 2003/0190883 A1 | 10/2003 | Shockey | |
| 2004/0083609 A1 | 5/2004 | Malott | |

FOREIGN PATENT DOCUMENTS

| GB | 243755 A | 9/1926 |
|---|---|---|
| GB | 2126963 A | 4/1984 |

OTHER PUBLICATIONS

Photos of race cars (believed to have been offered for sale, publicly used, and/or published prior to the filing date of this application).

* cited by examiner

*Primary Examiner*—Dennis H Pedder
(74) *Attorney, Agent, or Firm*—Gifford, Krass, Sprinkle, Anderson & Citkowski, P.C.

(57) ABSTRACT

A vehicle is provided with fan housings having inlets and an outlets. Fan are rotatably supported in the housings. The inlets intersect an airflow path along outer surfaces of the vehicle body such that a portion of the airflow is directed through each housing, causing the fans to rotate. A flow of spinning air exits each outlet and is directed toward a central plane of the vehicle.

16 Claims, 8 Drawing Sheets

VEHICLE HAVING AERODYNAMIC FAN ELEMENTS

REFERENCE TO RELATED APPLICATIONS

This application is a continuation-in-part of U.S. patent application Ser. No. 11/933,840, filed Nov. 1, 2007, which claims priority to U.S. provisional patent application Ser. No. 60/863,878, filed Nov. 1, 2006, both of which are incorporated herein by reference in their entirety.

FIELD OF THE INVENTION

The invention relates to aerodynamic control elements for automotive vehicles.

BACKGROUND OF THE INVENTION

The movement of a motor vehicle involves providing enough power to overcome, at least in part, aerodynamic drag. The efficiency of the shape of a vehicle in minimizing aerodynamic drag is referred to as drag coefficient. In general, drag can be minimized by promoting and maintaining laminar flow over the surface of the vehicle body. It is widely recognized that a 'perfect' vehicle body shape in terms of drag efficiency is a teardrop shape. Such a shape, however, poses other issues related to vehicle packaging, practicality and marketability. Modern production car designs have progressed significantly from early, chunky vehicle designs by making substantial improvements to the aerodynamic efficiency of the front two-thirds of the vehicle, i.e. to about the maximum cross sectional point of the vehicle. The demand, however, for a usable trunk space and rear indicator lighting in a typical vehicle dictate a generally truncated rear end, which results in turbulence. Turbulence behind the rear end of a moving vehicle is a major source of drag.

Typically, fixed wing elements or "spoilers" are used in an attempt to control the turbulence and also provide down force to improve rear wheel traction. The effectiveness of fixed spoilers is limited, however, at normal city or highway speeds. Accordingly, it remains desirable to provide an aerodynamic control element that improves over conventional designs by specifically addressing the need to minimize drag due to turbulence behind the rear end of the vehicle.

SUMMARY OF THE INVENTION

According to an embodiment of the present invention, a vehicle has a vehicle body that is generally symmetrical about a central plane. The body has a front portion, a mid portion and a rear portion, with a passenger compartment inside at least the mid portion of the body. A longitudinal axis extends from the front portion to the rear portion of the body. The vehicle has an outer surface including a roof surface facing upwardly and a pair of opposed side surfaces extending downwardly from the roof surface. A vehicle cross section is defined in a plane perpendicular to the longitudinal axis. The area of the cross section in the rear portion is less than the area of the cross section in the mid portion.

An airflow path is defined along at least a portion of each side surface of the body such when the vehicle moves along the longitudinal axis in a forward direction, air flows along the airflow paths. At least a portion of each airflow path is generally parallel to the longitudinal axis. A fan housing has an inlet and an outlet. The fan housing inlet is positioned so as to intersect the airflow path along one of the side surfaces of the body, a portion of the airflow flowing into the inlet, through the housing and out of the outlet.

A passive, unpowered fan is supported in the fan housing between the inlet and outlet such that as the portion of airflow flows through the housing, the fan is caused to spin about a fan axis. This creates a flow of spinning air that generally rotates about an outlet axis as the air flows out of the outlet. The outlet axis is directed inwardly towards the central plane of the vehicle body such that the flow of spinning air from the outlet converges inwardly. Multiple fans may be employed and may also be configured to provide this inwardly directed flow.

BRIEF DESCRIPTION OF THE DRAWINGS

Advantages of the present invention will be readily appreciated as the same becomes better understood by reference to the following detailed description when considered in connection with the accompanying drawings, wherein:

FIG. 6a is a top-elevational view of the vehicle of FIG. 6;

FIG. 8 is a rear perspective view of a portion of a vehicle according to the present invention illustrating details of the airflow.

DETAILED DESCRIPTION OF TH INVENTION

Figure 1:
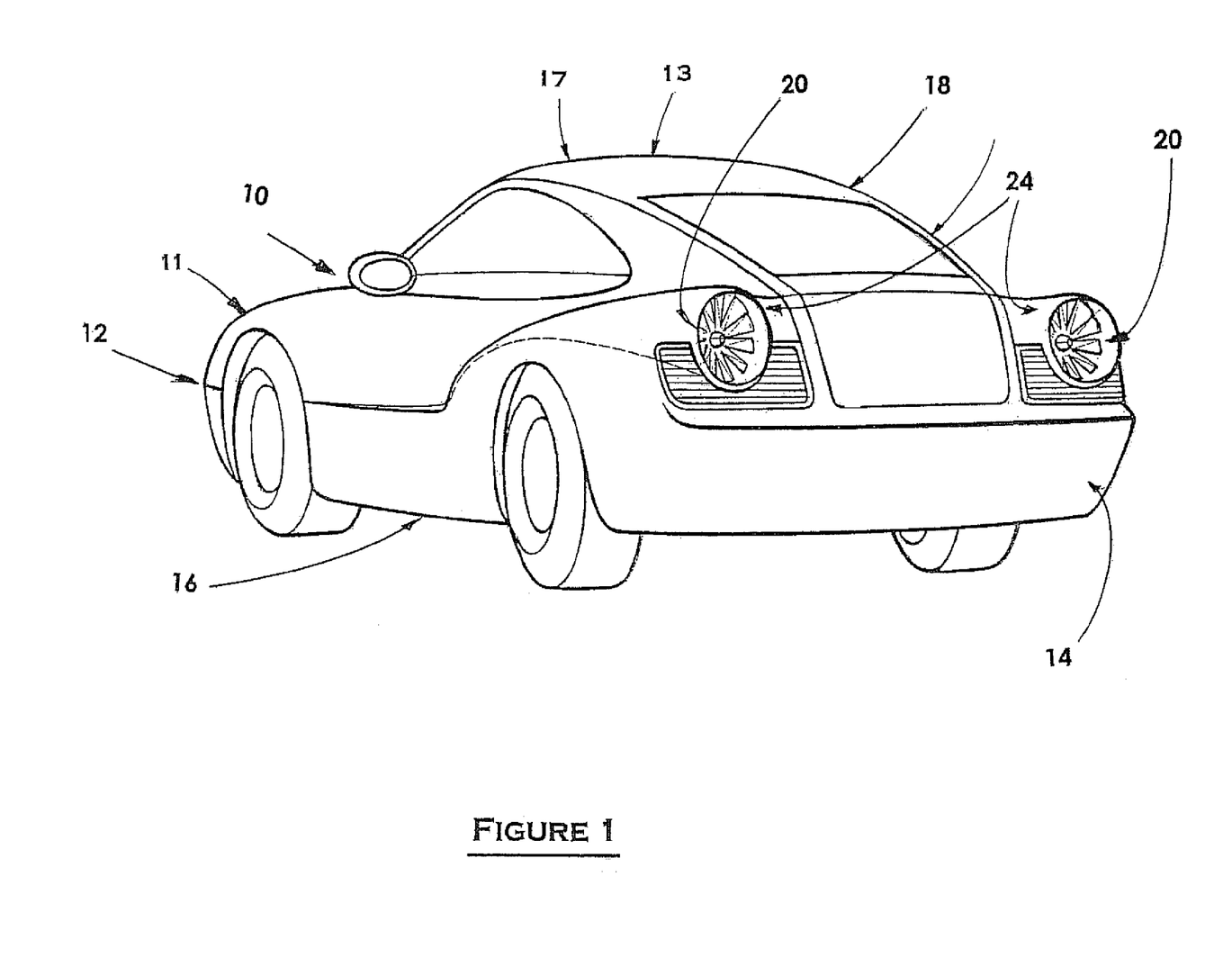
FIG. 1 is a rear perspective view of a vehicle having fan housings with unpowered fans according to one embodiment of the invention.
Figure 2:
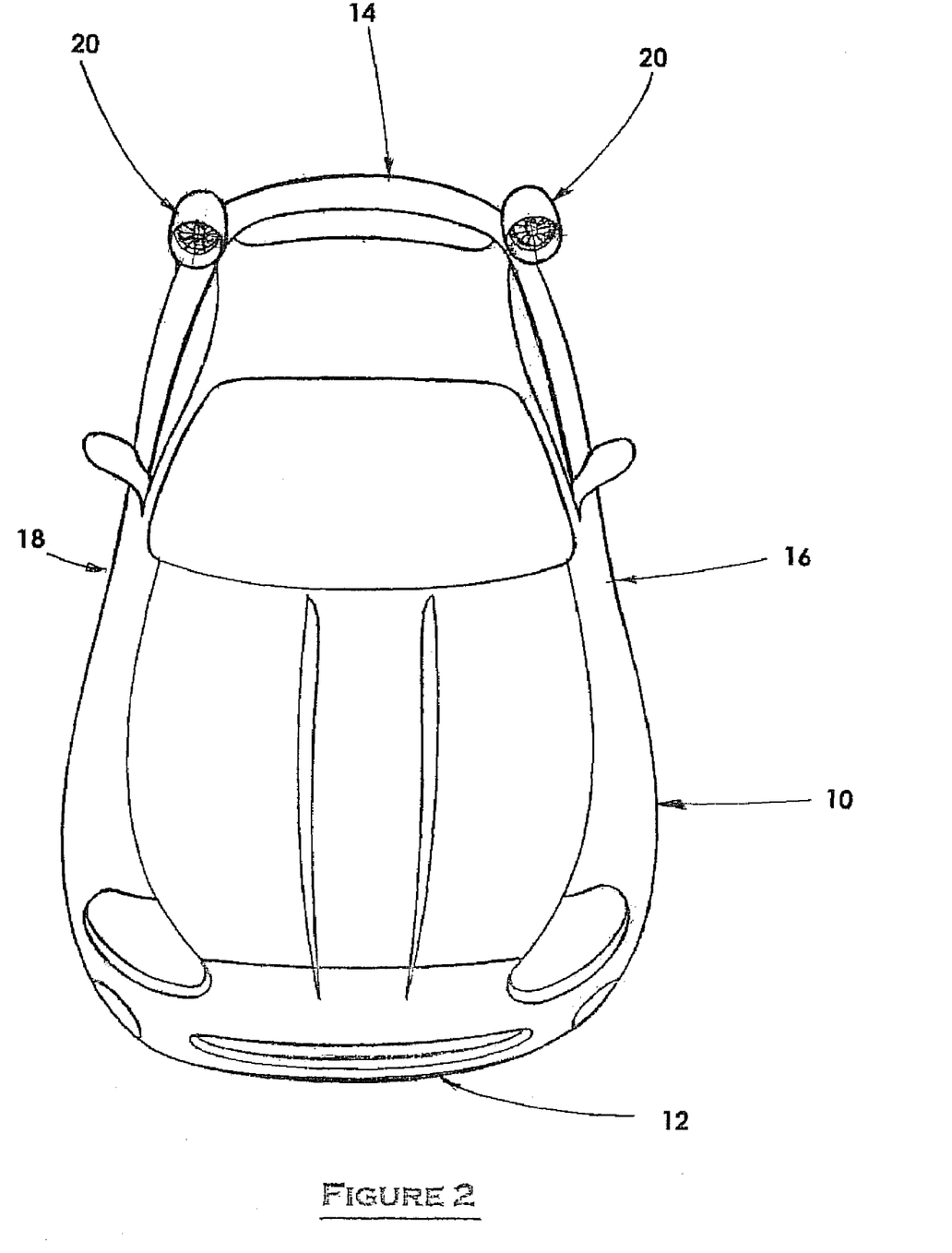
FIG. 2 is a front perspective view of another vehicle having fan housings and fans similar to those in FIG. 1.

Referring to FIGS. 1 and 2, a vehicle 10 is shown having opposite front 12 and rear 14 ends. The vehicle 10 has a roof surface 17 facing upwardly and opposite and spaced apart sides 16, 18 extending downwardly from the roof surface 17. The vehicle body is generally symmetrical about a longitudinally extending central axis and a vertical central plane. Described in greater detail below, the vehicle 10 also includes at least one passive, undriven fan driven by air flowing between the front 12 and rear 14 ends of the vehicle 10 for minimizing turbulence and drag behind the behind the vehicle 10 as the vehicle 10 moves in a forward direction.

The body of the vehicle 10 may be said to have a front portion 11 adjacent the front end, a mid portion 13 and a rear portion 15. The mid portion generally corresponds with the passenger compartment and is the portion of the car with the largest cross section. The rear portion 15 is adjacent the rear end and is the area where the cross sectional area decreases substantially. For vehicle with a truncated rear end, such as a station wagon, the rear portion may be said to be the portion right at the rear end, where the rear surface defines the rear end.

In FIGS. 1 and 2, fan housings 20 are fixedly secured to the rear end 14 of the vehicle 10 by outwardly extending arms 24, 26. A fan inside each fan housing 20 may be passive, wherein a flow of air passing over and around the vehicle 10 rotates the fans 20 and a portion of this airflow caused to spin about an outlet axis and is redirected to minimize turbulence and drag behind the rear end 14 of the vehicle 10.

Figure 3:
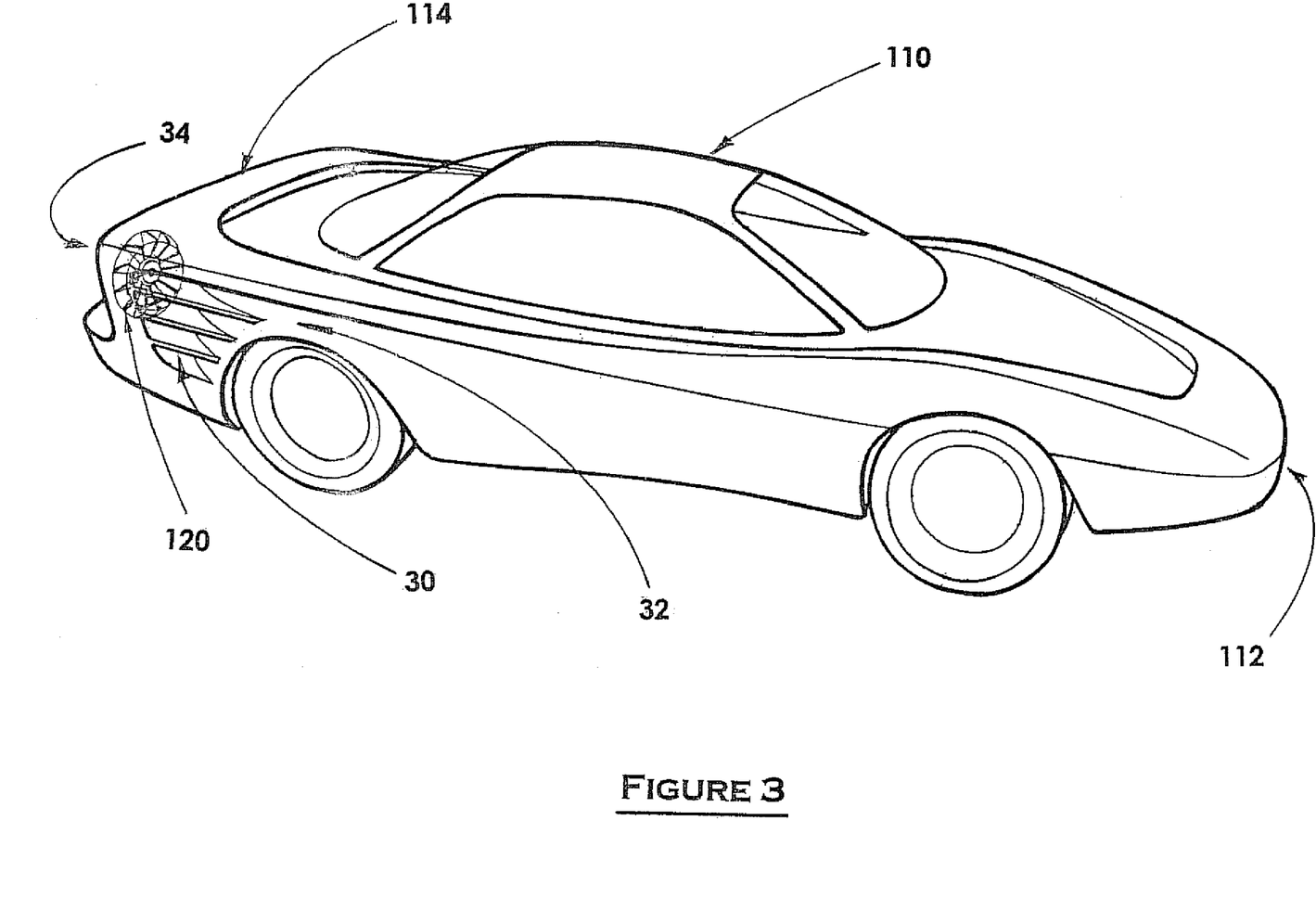
FIG. 3 is a side perspective view of a vehicle according to a second embodiment, in which the fan housings are integral with the rear quarter panels of the vehicle body.

Referring to FIG. 3, a second embodiment is shown wherein the fan housings are integral with the vehicle body. The fans 120 are mounted behind grills covering inlets 30 formed in a rear quarter panel 32 so as to appear integral therewith. Airflow enters the inlets 30 and passes through the fans 120, thereby rotatably driving the fans 120. The airflow is expelled through an outlet 34 at the rear end 114 of the vehicle 110.

Figure 4:
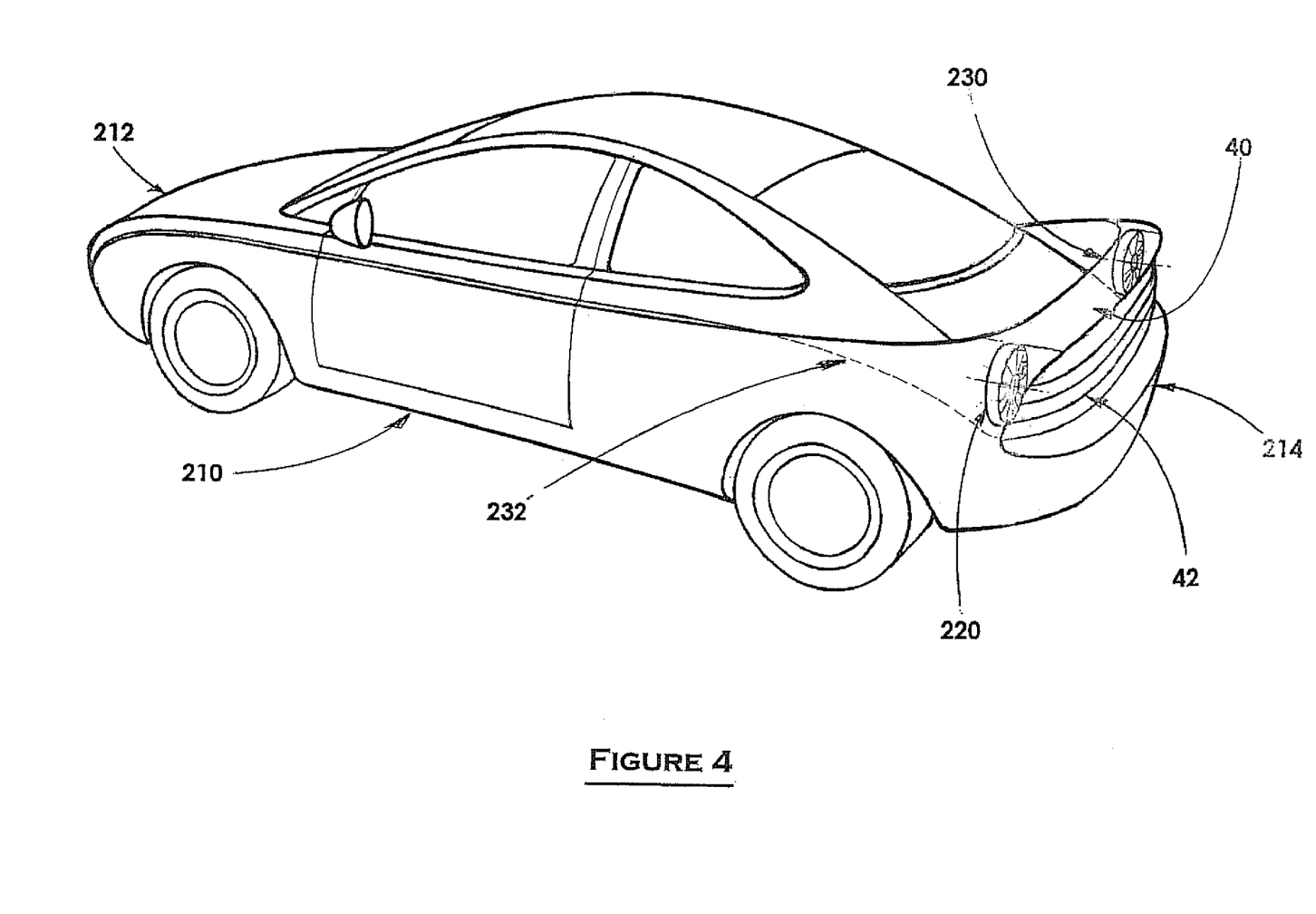
FIG. 4 is a rear perspective view of a vehicle according to a third embodiment, in which the fan housings are packaged integrally with the rear quarter panels and disposed below a fixed wing spoiler.

Referring to FIG. 4, a third embodiment is shown, wherein the fan housings are again integral with the vehicle body. In this embodiment, the fans 220 are mounted in the rear quarter panel 232 below a rear-mounted spoiler 40. In this design airflow is directed through an inlet 230 disposed beneath the spoiler and expelled through a grill-covered rear outlet 42. Similar to the embodiment shown in FIG. 3, the airflow is directed rearwardly behind the rear end 214 of the vehicle 210.

Figure 5:
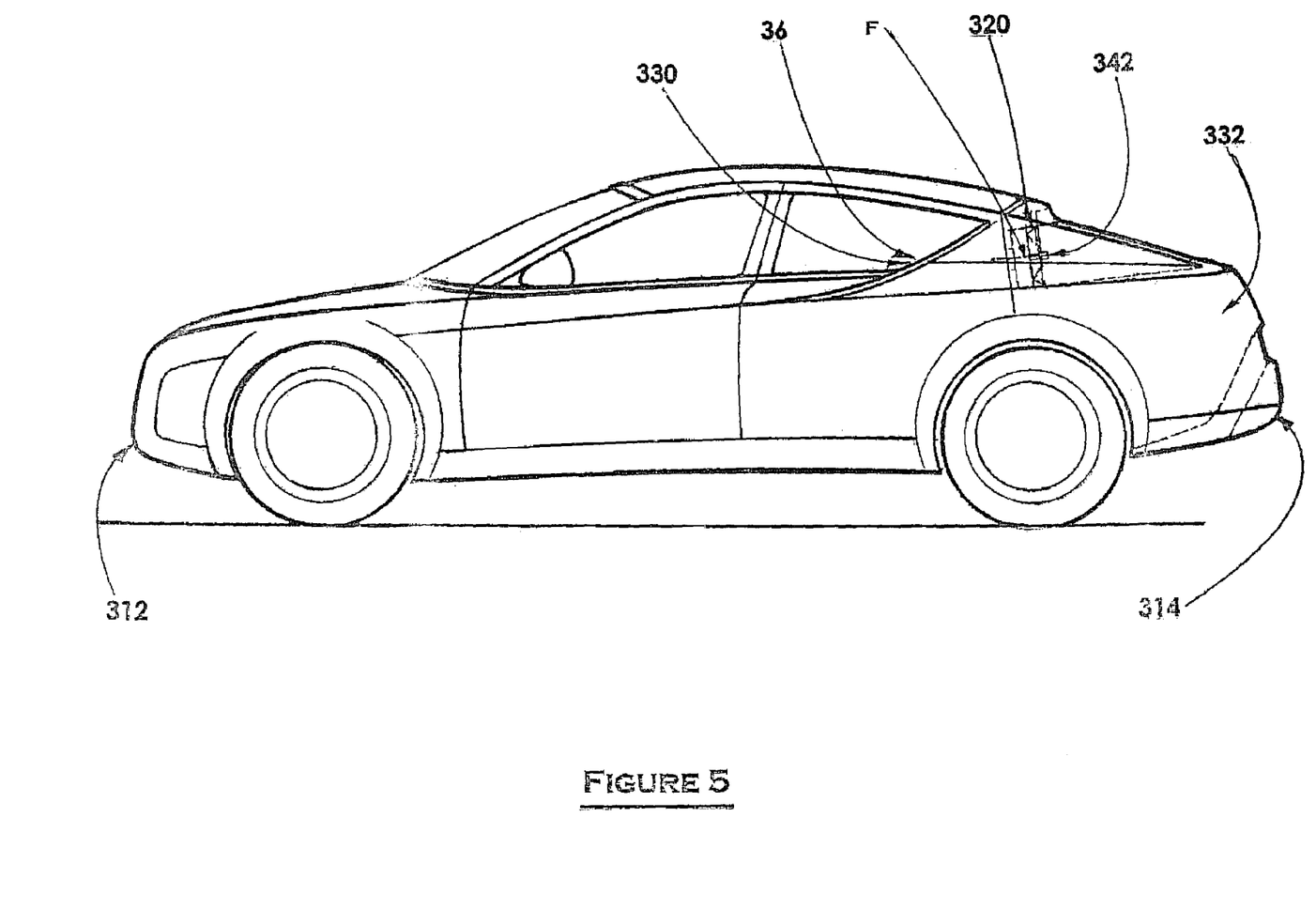
FIG. 5 is a side elevational view of a vehicle according to a fourth embodiment, in which the fan housings are disposed behind side-mounted scoops.

Referring to FIG. 5, a fourth embodiment is shown, wherein the fan 320 is disposed behind a scoop 36 that forms the inlet 330 for directing air flow toward the fan 320. The outlet is shown at 342. The fan is supported for rotation about a fan axis F.

Figure 6:
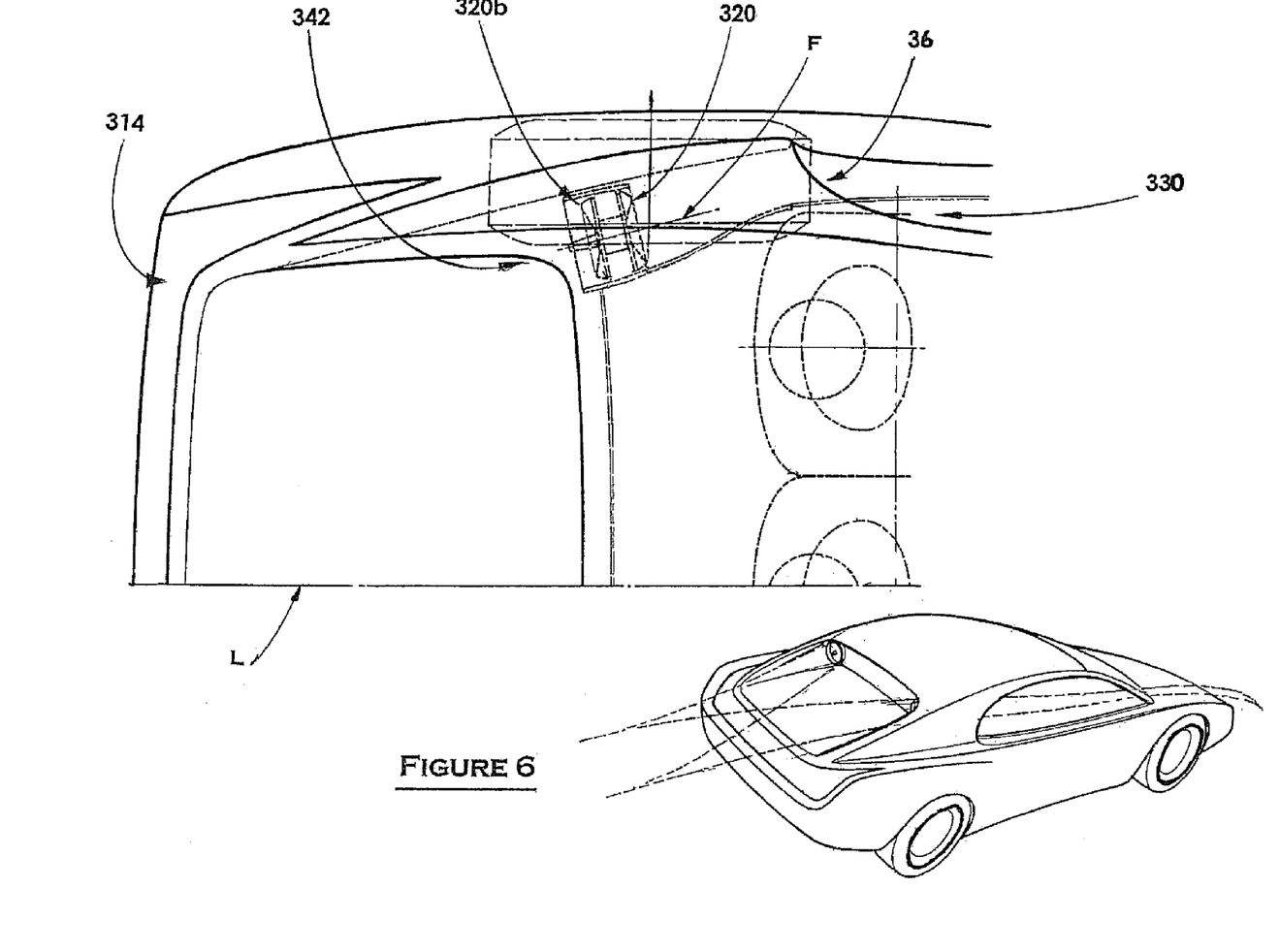
FIG. 6 is a rear perspective view of a vehicle according to a fifth embodiment.

Referring to FIGS. 6 and 6a, a fifth embodiment is shown wherein multiple fans 320, 320b are utilized in series for controlling airflow behind the vehicle. Further, the rotational axes of the fans 320, 320b F are angled or nonparallel with the longitudinal axis L of the vehicle. That is, the fan axes are angled inwardly toward the longitudinal axis L or the central plane, also represented by L. Airflow exits through outlet 342 and is directed along an outlet axis toward the central plane. Additionally, the fans 320 cause a rotational spin in the airflow. The vehicle of FIGS. 6 and 6A may be said to have a buttress or a C pillar that extends from adjacent the roof surface downwardly and rearwardly to the rear portion of the vehicle body. The inlet for the fan housing is an opening at the front and under the buttress and the outlet is an opening at the rear of the buttress.

Figure 7:
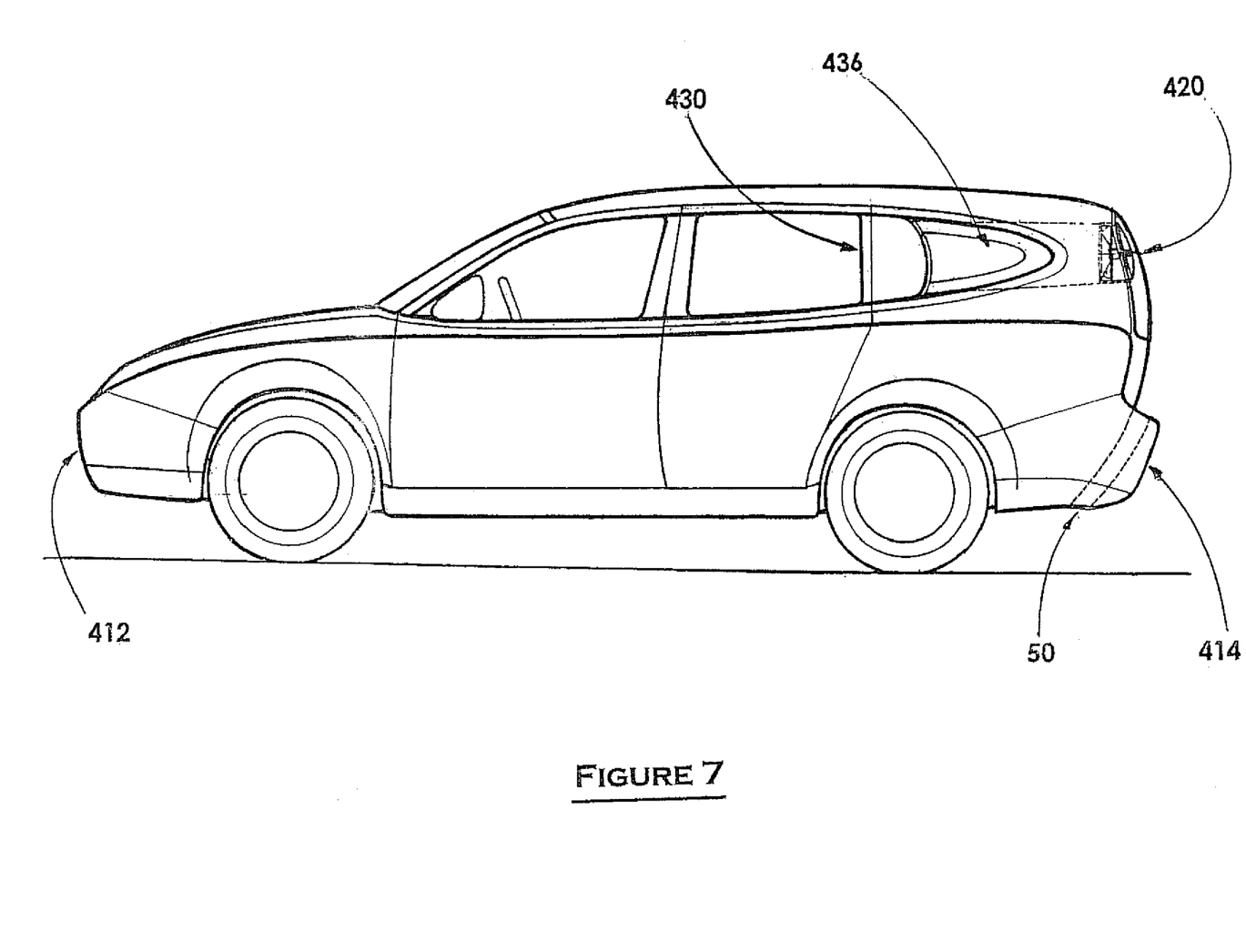
FIG. 7 is a side elevational view of a vehicle according to a sixth embodiment, in which a vent is used in combination with the fan housing to reduce drag associated with turbulence behind the vehicle.

Referring to FIG. 7, a sixth embodiment is shown, in which a vehicle with a truncated rear end is shown. This embodiment includes a vent 50 for directing air moving beneath the vehicle toward an area immediately behind the vehicle. The vent 50 works with the fan 420 to minimize turbulence behind the forward moving vehicle and, thereby reduce drag.

Figure 8:
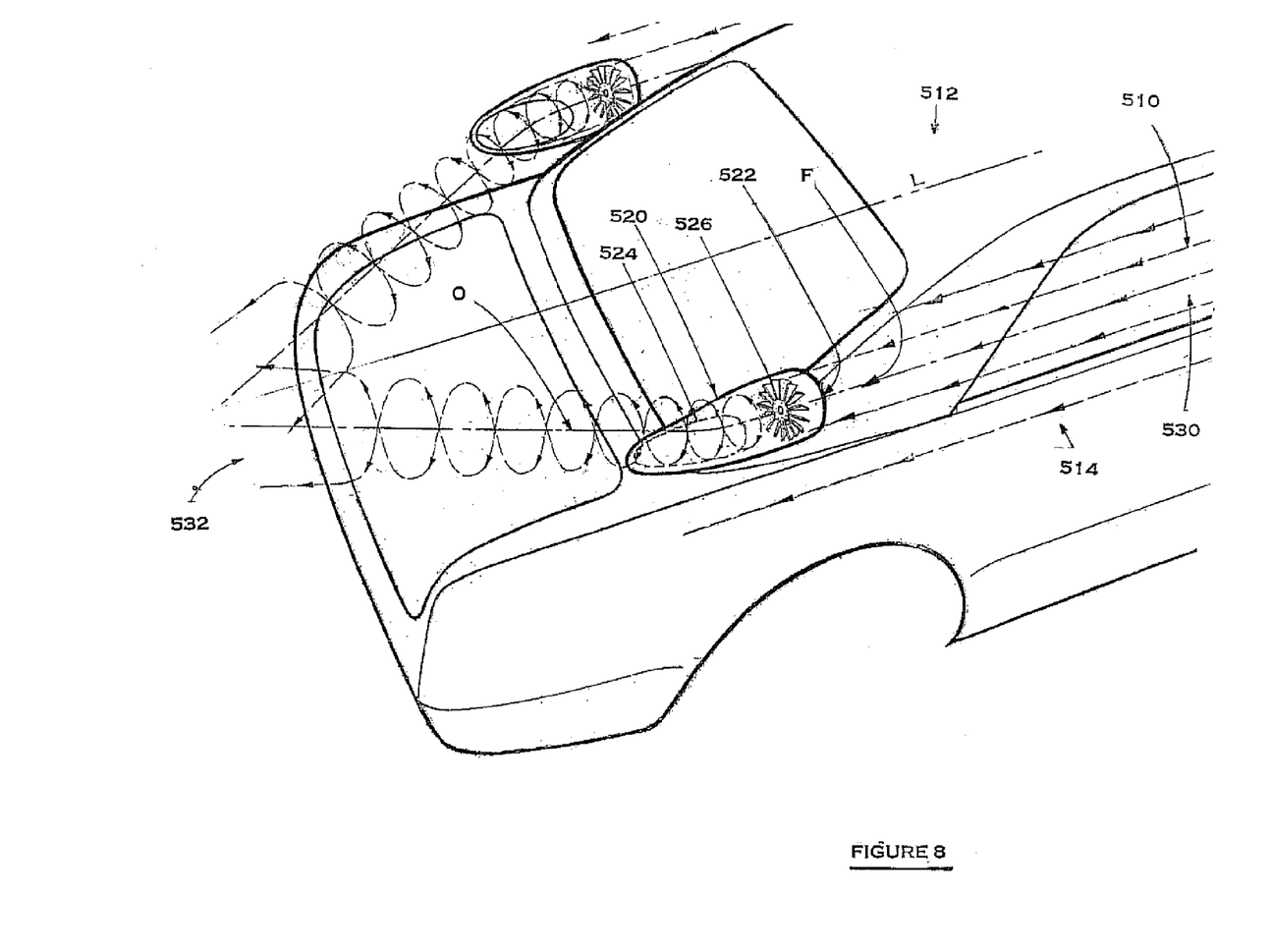

Referring now to FIG. 8, details of the air flow will be described in more detail. A plurality of airflow paths are illustrated at 510. These airflow paths extend along the roof surface 512 and side surfaces 514 of the vehicle body. A pair of fan housings 520 are interconnected with the vehicle body and have inlets 522 that intersect some of the airflow paths such that a portion of the airflow over the vehicle body flows through the housings 520. As will be clear, at least a portion of the airflow paths is generally parallel to the longitudinal axis of the vehicle. The airflow paths are shown as straight and parallel at the side of the vehicle. This may be considered a laminar flow zone 530. As known to those of skill in the art, when the body narrows, where it transitions from the mid portion to the rear portion, the airflow begins to become turbulent. A turbulent zone 532 is present at the rear end of the vehicle.

The housings 520 also have outlets 524. Fans 526 are supported in each housing and rotate about fan axes F. The spinning fans cause the air flowing through the housings to spin. As the spinning airflow exits the outlets, the airflow may be said to be spinning around an outlet axis O. As shown, the outlet axis is directed inwardly toward the central plane of the vehicle. This positioning, also causes the airflow to enter the turbulent zone, thereby altering the turbulent zone. Preferably, the inlets 522 are each positioned so that airflow from the laminar zone flows into the housings and the outlet directs a spinning flow of air into the turbulent zone.

In the embodiment of FIG. 8, the fan housings are connected to the sides of the vehicle body and the inlets extend from the side surfaces. As shown, the housings are each curved and are adjacent the C pillars of the vehicle. As also shown, the housings are above the belt line of the vehicle.

In all of the aforementioned embodiments, the fans are passively driven by air moving between the front and rear ends of the vehicle. The fans are not powered by a motor and obtain their spin entirely from the flow of air caused by the vehicle moving with respect to the surrounding air. The fans may be movably mounted to the rear end of the vehicle for either manual adjustment of the orientation of the fans or for automatic adjustment in response to predefined factors, such as vehicle speed or relative wind speed and/or direction. The fans may also be controlled automatically in response to predefined factors, such as vehicle speed or relative wind speed and/or direction.

The invention has been described in an illustrative manner. It is, therefore, to be understood that the terminology used is intended to be in the nature of words of description rather than of limitation. Many modifications and variations of the invention are possible in light of the above teachings. For example, one or more than two fan housings may be mounted to the vehicle and may be mounted in other areas conducive to minimizing drag due to turbulence toward and/or behind the rear end of the vehicle. Additionally, any of the features described above in connection with any of the embodiments may be combined with features from any other of the embodiments described herein. Thus, it should be clear that within the scope of the appended claim, the invention may be practiced other than as specifically described.

I claim:

1. A vehicle comprising:

a vehicle body being generally symmetrical about a central plane, the body having a front portion, a mid portion and a rear portion, a passenger compartment being defined inside at least the mid portion of the body;

the vehicle having a longitudinal axis extending from the front portion to the rear portion, the vehicle having an outer surface including a roof surface facing upwardly and a pair of opposed side surfaces extending downwardly from the roof surface, a vehicle cross section being defined in a plane perpendicular to the longitudinal axis, the area of the cross section in the rear portion being less than the area of the cross section in the mid portion;

an airflow path being defined along at least a portion of the roof surface and each side surface of the body such that when the vehicle moves along the longitudinal axis in a forward direction, air flows along the airflow paths, at least a portion of each airflow path being generally parallel to the longitudinal axis;

a fan housing having an inlet and an outlet, the fan housing inlet disposed so as to intersect the of airflow path along one of the surfaces of the body, a portion of the air flow flowing into the inlet, through the housing and out of the outlet;

at least one passive, unpowered fan supported in the fan housing between the inlet and outlet such that as the portion of airflow flows through the housing, the fan is caused to spin about a fan axis, thereby creating a flow of spinning air that generally rotates about an outlet axis as the air flows out of the outlet, the outlet axis being directed inwardly towards the central plane of the vehicle body such that the flow of spinning air from the outlet converges inwardly.

2. The vehicle of claim 1, wherein a laminar flow zone is defined along at least a portion of the side surface of the vehicle body where the flow of air is generally laminar and a turbulent flow zone is defined adjacent the rear portion of the vehicle body where the flow of air is generally turbulent, the inlet of the fan housing receiving a flow of air from the laminar zone and the outlet of the fan housing directing the spinning outlet flow towards the turbulent zone.

3. The vehicle of claim 1, wherein the fan housing is disposed on the vehicle body and the fan housing inlet extends at least partially from the side surface of the vehicle so as to intersect the air flow path.

4. The vehicle of claim 3, wherein the fan housing is curved and the outlet is directed inwardly toward the central plane.

5. The vehicle of claim 1, wherein the fan housings are integral with the vehicle body.

6. The vehicle of claim 5, wherein the inlet is an opening in the side of the vehicle body and the outlet is an opening in the rear portion of the vehicle.

7. The vehicle of claim 5, wherein the vehicle has a buttress extending from adjacent the roof surface downwardly and rearwardly to the rear portion, the inlet being an opening under the front of the buttress and the outlet being an opening at the rear of the buttress.

8. The vehicle of claim 5, wherein the fan housings are integral with the rear portion of the vehicle body.

9. The vehicle as set forth in claim 5, wherein the fan is disposed behind a grill-covered inlet integral with a rear quarter panel of the vehicle.

10. The vehicle of claim 1, wherein the fan housing includes a side-mounted scoop that forms the inlet for directing airflow into the housing.

11. The vehicle as set forth in claim 1, wherein the fan housing is defined below a spoiler mounted to the rear end of the vehicle.

12. The vehicle as set forth in claim 1, wherein the fan axis is nonparallel with the longitudinal axis of the vehicle.

13. The vehicle as set forth in claim 12, including a pair of fan housings disposed on opposite sides of the vehicle in a generally symmetrically opposite manner, the fan axes each extending rearwardly and inwardly toward the central plane.

14. The vehicle as set forth in claim 1, including a plurality of fans each supported on the same fan axis.

15. The vehicle as set forth in claim 1, wherein the vehicle body has an area where the cross sectional area is greatest, the fan housing being disposed rearwardly of the area of largest cross sectional area.

16. The vehicle as set forth in claim 1, wherein the fan housing is disposed above a belt line of the vehicle.

\* \* \* \* \*

UNITED STATES PATENT AND TRADEMARK OFFICE
CERTIFICATE OF CORRECTION

PATENT NO. : 7,695,050 B2  Page 1 of 1
APPLICATION NO. : 12/491751
DATED : April 13, 2010
INVENTOR(S) : Colin Neale It is certified that error appears in the above-identified patent and that said Letters Patent is hereby corrected as shown below:

Title Page item 57 Abstract, line 1: Delete "an";
Title Page item 57 Abstract, line 2: Replace "Fan" with --Fans--;
Column 2, line 56: Delete first occurrence of "behind the";
Column 2, line 64: Replace "vehicle" with --vehicles--;
Column 4, line 7: After "positioning" remove ",";
Column 4, line 41: Replace "claim," with --claims,--; and
Column 4, line 67: After "the" remove "of".

Signed and Sealed this

Thirteenth Day of July, 2010

David J. Kappos
*Director of the United States Patent and Trademark Office*